Figure 1:
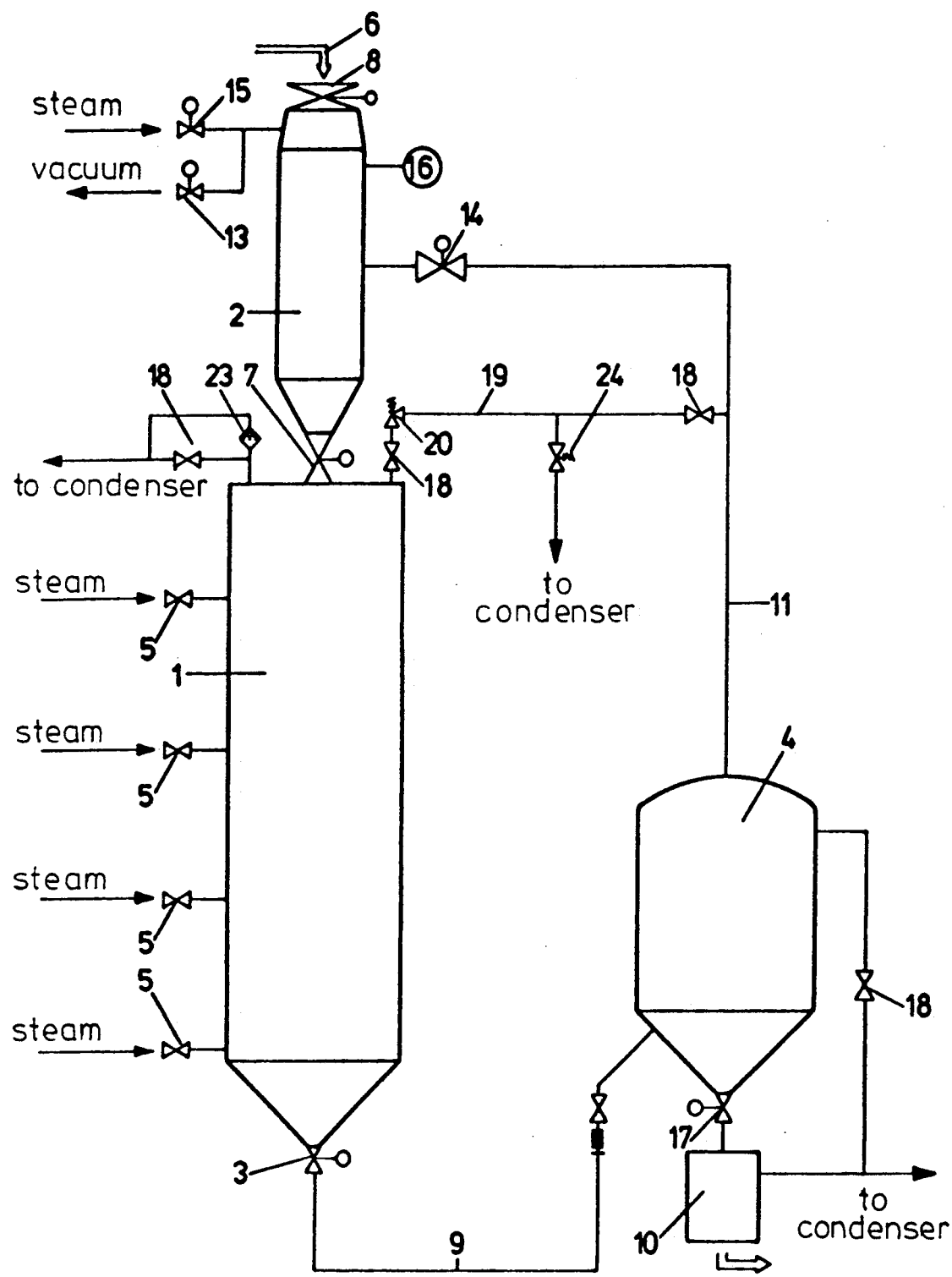

United States Patent [19]

Fosbol et al.

[11] Patent Number: 5,008,375

[45] Date of Patent: Apr. 16, 1991

[54] METHOD FOR A CONTINUOUS HYDROLYZING OF KERATINACEOUS MATERIALS

[75] Inventors: Peder Fosbol, Nybrovej; Henrik Ullum, Lykkesholm; Birgitte Korremann, Abjergvej, all of Denmark

[73] Assignee: Atlas Industries A/S, Ballerup, Denmark

[21] Appl. No.: 460,150

[22] PCT Filed: May 16, 1989

[86] PCT No.: PCT/DK89/00122

§ 371 Date: Jan. 29, 1990

§ 102(e) Date: Jan. 29, 1990

[87] PCT Pub. No.: WO89/11797

PCT Pub. Date: Dec. 14, 1989

[30] Foreign Application Priority Data

Jun. 1, 1988 [DK] Denmark .............................. 2969/88

[51] Int. Cl.$^5$ ........................... A23J 1/10; C07K 3/10; C08H 1/06
[52] U.S. Cl. .................................... 530/357; 422/189; 422/269; 422/273; 426/455; 426/456
[58] Field of Search ......................................... 530/357

[56] References Cited

U.S. PATENT DOCUMENTS

| 3,617,313 | 11/1971 | Harrington, Jr. et al. | 204/15 |
| 4,172,073 | 10/1979 | Kadri et al. | 530/357 |
| 4,378,311 | 3/1983 | Retrum | 530/357 |

FOREIGN PATENT DOCUMENTS 2000822  2/1986  United Kingdom .

Primary Examiner—Howard E. Schain
Assistant Examiner—Choon P. Koh
Attorney, Agent, or Firm—Antonelli, Terry, Stout & Kraus

[57] ABSTRACT

Continuous hydrolyzing of keratinaceous material is effected in an elongated hydrolyzing vessel (1) under suitable pressure and temperature which is established by direct steam injection through injection valves, whereby the product mass is heated, fluidized and agitated at one and the same time.

An inlet chute (2), which is closed in a pressure-proof manner, leads the material in batches and at intervals into the vessel (1), and an outlet chute (3) at intervals leads the hydrolyzed material to an economizer (4) and further to a pressure-free removal vessel (10).

The product mass in the hydrolyzing vessel (1) moves through the vessel as plunger flow established by the overpressure in the inlet chute (2).

7 Claims, 2 Drawing Sheets

METHOD FOR A CONTINUOUS HYDROLYZING OF KERATINACEOUS MATERIALS

The invention relates to a method for the continuous hydrolizing of keratinaceous materials by heating under pressure for the duration of time it takes for the desired hydrolization to be achieved.

It is known to hydrolize keratinaceous materials, especially feathers, bristle, nails, horn, hooves and the like, so that the keratinaceous material is converted into nutritious and digestible products, particularly for the feeding of animals.

From U.S. Pat. No. 3,617,313, a hydrolyzing apparatus is known whereby feathers are impressed to form a pressure-tight plug which is continuously introduced into the inlet of the hydrolizing vessel, thus closing the inlet in a pressure-tight manner. Water and steam are introduced into the hydrolizing vessel itself, while the vessel wall is a steam jacket for the heating of the product mass during the process, which is effected under vigorous agitation by means of paddle elements which contribute both towards the fluidization of the product mass and its transport through the vessel. The apparatus is both mechanically complicated and very energy-demanding, the reason being that the product mass must first be compressed to form a pressure-tight plug, and thereafter comminuted and fluidized in large amounts of water during the hydrolization.

Another apparatus for the continuous hydrolizing of keratinaceous materials is known from U.S. Pat. No. 4,286,884, whereby two vessels are used in the apparatus. In the first vessel, the material is heated and fluidized under such strong agitation that the material is comminuted. Hereafter, it is pumped by means of a special pressure-proof screw pump to a heated hydrolization reactor in which the hydrolizing takes place under suitable overpressure and temperature and under constant agitation, and from which the product mass is removed via a pressure-proof screw pump for further processing, especially the draining off of the very large amounts of water which are used to render the product capable of being pumped. This USA patent publication also provides a very detailed account of the chemical and biological aspects of the hydrolization, particularly with regard to the pressure and temperature conditions under which an optimum hydrolisis can be achieved. Therefore, this patent application does not touch upon these aspects in more detail, but refers to all that is known concerning these aspects from U.S. Pat. No. 4,286,884.

The object of the present invention is to provide a method and an apparatus for the continuous hydrolyzing of keratinaceous materials whereby both the method and the apparatus are to a great extent simplified in relation to the prior art, so that a reduction is achieved in both the energy consumption and in the costs of the apparatus. Moreover, the necessity is avoided of having to add large amounts of water to the product mass, which must thereafter be removed from the hydrolyzed product.

This is achieved by following the method as characterized in claim 1, for example by the use of an apparatus as disclosed and characterized in claim 8. The heating of the material is effected by the direct injection of steam, which at one and the same time heats, moistens and agitates the product mass. It is thus not necessary to use a hydrolyzing vessel where the vessel wall constitutes heating surfaces with pressure chambers for the heating medium. Since the product mass must be heated to a temperature in the range from approx. 130° C. to approx. 200° C., the heat jacket on the known kinds of apparatus must be heated to higher temperatures. Therefore, it is a great advantage to be able to avoid such heating surfaces, especially when seen from an operational and cost point of view.

Furthermore, all forms of agitators, pressure-proof shaft bushing with stuffing boxes etc. are avoided, which further reduces the cost of the apparatus and the operation hereof.

The hydrolyzation process itself is effected under overpressure at a temperature above 100° C. In fact, the higher the pressure and the temperature, the more rapid the hydrolyzation. For example, if the pressure is approx. 8 bar, for which the corresponding temperature is approx. 175° C., a hydrolyzation can be effected in approx. 15 minutes. If the pressure is increased to 10 bar, i.e. a process temperature of approx. 185° C., the process time for the hydrolyzation is reduced to approx. 10 minutes.

The capacity of a given apparatus can thus be increased by raising the pressure and the temperature. Normally, a steam pressure in the order of 8 bar will be chosen, in that this will allow the use of ordinary industrial boilers.

The heating by the direct injection of steam results only in the moistening of the material, but the addition of the large amounts of water as with the known apparatus is avoided. The apparatus according to the invention can also use superheated steam, for example if the factory plant to which the hydrolyzation apparatus is to be connected is already using superheated steam. The amounts of water can be removed from the hydrolyzed product by pressing or drying before further processing, e.g. before being ground.

Driven by the difference in pressure across the vessel, the product mass moves by plunger flow through the vessel from the inlet chute to the outlet chute, in that a new part-portion is introduced regularly into the inlet chute and a hydrolyzed part-portion is ejected from the outlet chute. During operation with continuous hydrolyzing, the vessel is substantially filled with the product mass which, in relatively small steps, moves as plunger flow through the vessel. The throughput time is preferably in the order of 5–30 minutes, and it is worthy of note that this is when the raw material is introduced direct from, for example, the slaughtering plant, in that the raw material is fed to the inlet chute in an uncleaned and untreated condition. However, it will be possible to achieve lower processing times if the apparatus is arranged for higher process pressure and temperature. In certain cases, longer processing times will be able to be accepted, i.e. lower process pressure and temperature while still achieving a profitable production under the given conditions. Consequently, the method and the apparatus according to the invention have a very wide range of application.

By following the method as disclosed in claim 2, for example while using an an apparatus according to the invention as characterized in claim 9, the plunger flow is assisted by gravity, and it will be possible to keep the apparatus in operation even with smaller amounts of material than those for which it is dimensioned, without this having any detrimental effect on the energy economy. By disposing the vessel in an upright manner, it is avoided that the product mass can adhere to the wall of the vessel and result in undesired packing together.

By following the method as characterized in claim 3, for example while using an apparatus according to the invention as characterized in claim 10, it is ensured that the product mass is agitated to a degree which is sufficient for the process to be effected as quickly as desired, i.e. in approx. 5-30 mins., see also above, and an advantageous energy economy is achieved. The number of injection pipes or valves and their distribution on the vessel jacket depends on several factors, among other things by the kind of material to be treated in the apparatus, i.e. on whether it is feathers, bristle, horn or nails, mixtures hereof or quite another material. In practice, the apparatus will be equipped with a sufficient number of steam injection nozzles which can be opened and closed as required. It will also be possible to use one or several central injection pipes for steam, e.g. disposed axially in the vessel, particularly in cases of vessels of large diameter.

By following the method as characterized in claim 4, for example while using an apparatus according to the invention as characterized in claim 11, the resulting inlet chute for the hydrolyzing vessel is one which does not require any moving parts other than the closing devices used at the filling opening to the inlet chute and between the inlet chute and the hydrolyzing vessel. Among other things, the use of the known forced-feeding principle with a pressure-proof pump and all of the problems which arise in connection herewith is hereby avoided.

By following the method as characterized in claim 5, for example while using an apparatus according to the invention as characterized in claim 12, the supply of air to the product mass is reduced, which increases the penetration of steam into the product mass, hereby achieving a quicker process for the reason that the product is heated more quickly.

By following the method as characterized in claim 6, for example while using an apparatus according to the invention as characterized in claim 13, the possibility is provided for the hydrolyzed product to be "shot" or by plunger flow conveyed from the hydrolyzing vessel to an economizer which is an intermediate storage vessel under lower pressure than the hydrolyzing vessel. The hydrolyzed product is hereby conveyed further without mechanical transport mechanisms or pumps. The introduction of limitations in the clearance in the transport path is hereby avoided, so that even relatively large pieces of material can pass unhindered all the way from the feed-in opening to the inlet chute to the pressure-free removal vessel. The only restriction on the transport is the opening in the closing valves, which in practice can be configured without problems with sufficient opening, the result being that it is not normally necessary to effect any kind of sorting of the raw material before it is introduced into the inlet chute.

The outlet chute system and the storage vessel can be coupled together with the inlet chute, hereby allowing the residual energy in the steam to be used for the preheating of the amount of material in the inlet chute, and possibly for the moistening hereof, whereby the energy utilization of the process is considerably improved. Moreover, this provides a substantially closed circuit for the steam, which to a great extent reduces the inconveniences arising from the smells from such a plant.

The method according to the invention is preferably effected as disclosed and characterized in claim 7, whereby the process time remains short and the apparatus acquires a large, continuous capacity.

Figures 2, 3:
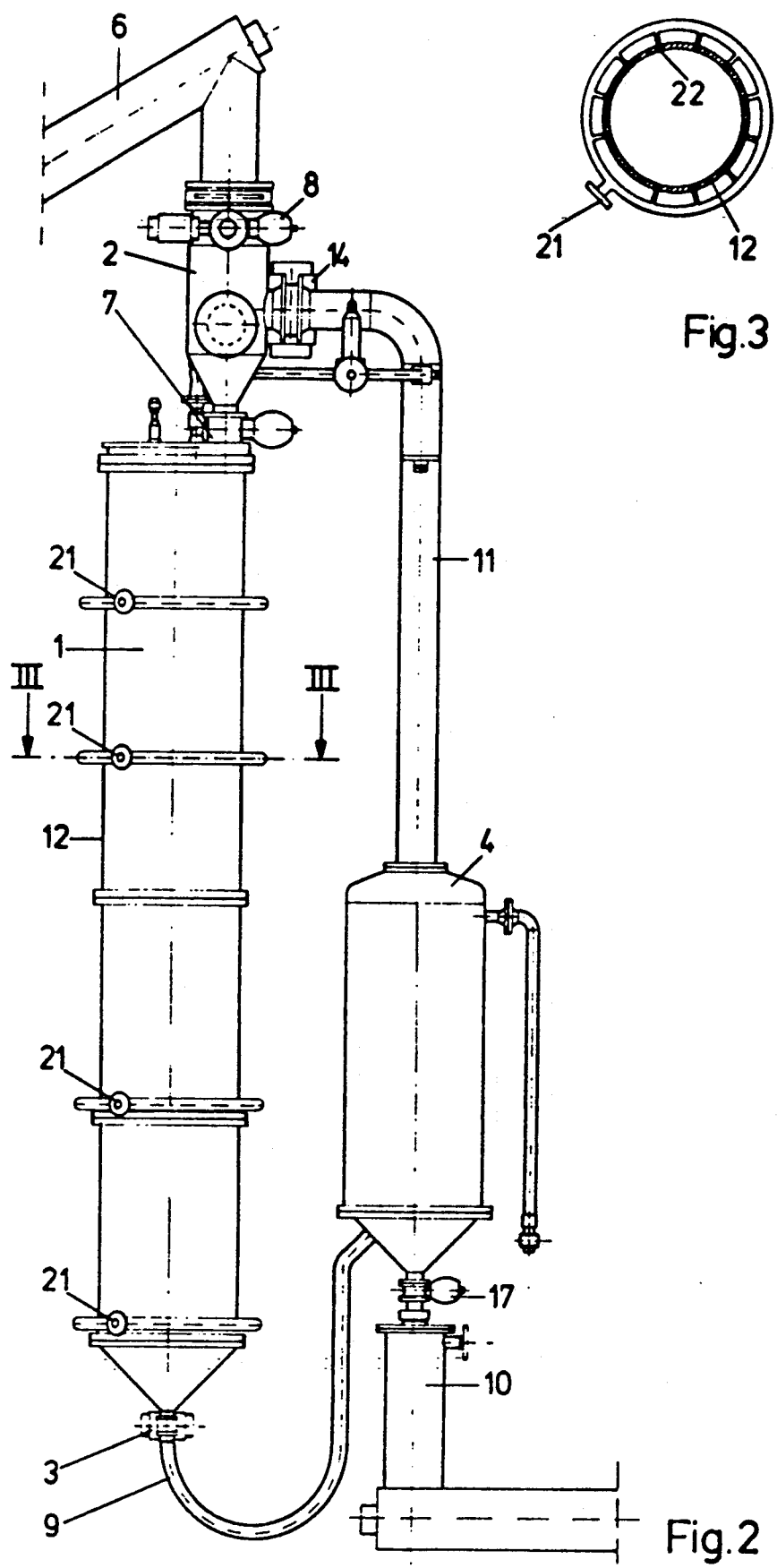

The invention will now be described in more detail with reference to the drawing, which illustrates a preferred embodiment, in that FIG. 1 shows a diagram of the method according to the invention, FIG. 2 is a schematic diagram of an apparatus according to the invention, and FIG. 3 shows a section III—III in the hydrolyzing vessel in the apparatus in FIG. 2.

In FIG. 1 is seen an example of a diagram covering the method according to a preferred embodiment of the invention. The raw material is introduced into a inlet chute 2 through a closeable opening 8, e.g. by means of a conveyor 6. The valve 7 is closed and the chute vessel 2 is pressure-free during the filling of the raw material. When a suitable amount of raw material has been introduced into the chute vessel 2, the filling opening 8 is closed in a pressure-tight manner. The valve 13 is opened, a vacuum is established in the chute vessel 2 and the valve 13 is closed again. Immediately hereafter, the valve 14 is opened and residual steam from the economizer 4 flows into the chute vessel 2 because of the difference in pressure, after which the valve 14 is closed again. The chute vessel 2 is now under pressure of approx. 2 bar, which originates from the economizer 4, but it is still completely closed. Hereafter, the valve 15 is opened and a steam pressure of approx. 10 bar is applied to the chute vessel 2, and when a pressure gauge 16 registers that a pressure of approx. 10 bar has been built up in the vessel 2, the chute valve 7 is opened and the material (a batch) in the vessel 2 is "shot" into the hydrolyzing vessel 1, which is under a lower pressure of approx. 8 bar. The pressures indicated are naturally only an example of how the method can be effected and of how the apparatus can be arranged. When the apparatus has been started and is in continuous operation, the hydrolyzation vessel 1 is substantially filled with product mass, which stepwise at plunger flow moves from the inlet chute through the vessel to an outlet chute 3, which is a valve, e.g. a ball or spade valve, which is opened at regular intervals and allows a hydrolyzed batch of material to leave the hydrolyzation vessel 1. The hydrolyzed material is fed via a pipe 9 to an intermediate vessel 4, a so-called economizer, in which the pressure is held at approx. 2 bar. The difference in pressure between the economizer 4 and the hydrolyzation vessel 1 makes it possible for the hydrolyzed material to be "shot" completely into the economizer 4.

From the economizer's bottom valve 17, the material can be transferred to a pressure-free removal vessel 10 and conveyed for further processing, e.g. for drying, pressing, grinding or other forms of treatment.

A steam pipe 11 in the top of the economizer 4 leads residual steam back to the inlet chute 2 via a valve 14 (see above).

The hydrolyzation vessel 1 is arranged with a number of steam injection pipes with valves 5, hereby enabling the desired steam pressure, e.g. at 8 bar, to be blown directly into the hydrolyzation process, whereby the product mass is heated to around 175° C., moistened and agitated, while at the same time the product mass moves at plunger flow through the vessel 1. The movement of the product mass through the vessel and the time that it spends in said vessel are used as control parameters for the process.

The valves 18 are, for example, manual valves which are used in connection with the start-up and closing down of the process. 23 is an air separator arranged for the removal of the main part of the air which is introduced into the hydrolyzation vessel 1 together with the raw material. 20 is an overpressure valve which ensures that the desired process pressure is not exceeded. 24 is also an overpressure valve which maintains the process pressure during the closing down of the apparatus. If, for example, the process pressure in the hydrolyzation vessel 1 is at approx. 8 bar, the valve 20 will be set to open at approx. 8.5 bar and the valve 24 at approx. 3 bar.

In FIGS. 2 and 3 is seen an apparatus according to the invention built to have a capacity in the order of 0.5–20 tons per hour. The references used with this apparatus are the same as those used in FIG. 1, but only the apparatus itself is shown and not all of the pressure pipes and temperature devices and steam pipes etc.

The main element in this apparatus is the hydrolyzing vessel 1, which is a vertical, elongated cylindrical pressure vessel with a jacket 12 with smooth inner walls. Through the jacket 12 annular steam injection pipes 21 with injection openings or nozzles 22 lead steam in a substantially right-angled direction in towards the centre of the hydrolyzing vessel 1, see especially FIG. 3. The length of the hydrolyzing vessel 1 and the number of steam injection pipes 21 and injection openings 22 will depend on the kind of product to be processed and on the desired process speed and capacity. The whole apparatus is controlled by an electronic process control unit on the basis of the measurements of pressure, level and temperatures at all relevant points, and on the basis of empirical values regarding pressure, temperature, plunger-flow frequency and process time which are programmed into the control unit.

The shown and described example relates to an elongated, vertical hydrolyzing vessel, but there is nothing to prevent the vessel being disposed in a horizontal or inclined manner. If an apparatus according to the invention is required to work with a lower capacity than that for which it has been dimensioned, e.g. because the amounts of raw material have been reduced for a period of time, the process temperature or the level can be reduced. A given apparatus thus has a process capacity which can be greatly varied without any detrimental effect on the course of the process.

It will be obvious to those familiar with the art that the inlet chute arrangement, the outlet chute arrangement and the economizer etc. can be configured in many ways other than those shown and explained, without deviating from the spirit of the invention. For example, instead of the inlet chute described, many other forms of forced-feeding of the hydrolyzation vessel 1 can be used, e.g. with a screw pump according to U.S. Pat. No. 4,286,884, or other means of forced-feeding whereby it is possible to introduce material into the hydrolyzation vessel without this vessel being subject to any significant pressure drop. The main idea of the invention is the hydrolyzation vessel 1, which functions completely without agitators etc., and where the heating is effected by one form or another of direct steam injection.

We claim:

1. Method for the continuous hydrolyzing of keratinaceous material, which is heated under pressure for the duration of time it takes for the desired hydrolyzation to be achieved, characterized in that the material is introduced in batches at intervals into the one end of an elongated, pressure-tight hydrolyzing vessel through a pressure-proof inlet chute, in that the material is heated by the direct injection of steam into the hydrolyzing vessel while it is conveyed by means of pressure difference through the vessel towards a pressure-tight outlet chute which is opened at intervals for the emptying of a hydrolyzed batch of material, and in that the movement of the product mass through the hydrolyzing vessel takes place as a step-like plunger flow substantially in step with the inlet chute.

2. Method according to claim 1, characterized in that the hydrolyzing vessel (1) is disposed in such a manner that the inlet end is above the outlet end, preferably so that the vessel is substantially vertical.

3. Method according to claim 2, characterized in that the injection of steam into the product mass is effected substantially at right angles to the movement of the product mass in the vessel.

4. Method according to claim 1, characterized in that the inlet chute comprises a pressure vessel with closeable connection to the hydrolyzing vessel, a closeable filling opening for direct introduction of the raw materials, and the necessary steam pipes and valves.

5. Method according to claim 4, characterized in that the inlet chute further comprises at least one vacuum pipe with necessary valves, arranged to establish an underpressure in the chute.

6. Method according to any of the claims 1–5, characterized in that the hydrolyzed material is transferred to a pressure-proof vessel, preferably by means of the difference in pressure between the vessel and the outlet chute, said vessel comprising a device for the removal of the hydrolyzed material, and in that the vessel is in connection with the inlet chute.

7. Method according to claim 1, characterized in that the product mass remains in the hydrolyzing vessel 5–30 minutes under a process pressure of 2–15 bar and the temperature corresponding hereto.

* * * * *